(12) United States Patent
Byrne et al.

(10) Patent No.: US 11,054,085 B1
(45) Date of Patent: Jul. 6, 2021

(54) SELF BALANCING HANGER BRACKET

(71) Applicant: HKC-US, LLC, Memphis, TN (US)

(72) Inventors: Brendan P. Byrne, Germantown, TN (US); Alton Burrage, Memphis, TN (US)

(73) Assignee: HKC-US, LLC, Memphis, TN (US)

( * ) Notice: Subject to any disclaimer, the term of this patent is extended or adjusted under 35 U.S.C. 154(b) by 11 days.

(21) Appl. No.: 16/522,114

(22) Filed: Jul. 25, 2019

(51) Int. Cl.
| | | |
|---|---|---|
| F21V 21/03 | (2006.01) | |
| F16M 13/02 | (2006.01) | |
| F04D 29/64 | (2006.01) | |
| F04D 25/08 | (2006.01) | |

(52) U.S. Cl.
CPC ......... *F16M 13/027* (2013.01); *F04D 29/646* (2013.01); *F21V 21/03* (2013.01); *F04D 25/088* (2013.01); *F16M 2200/04* (2013.01)

(58) Field of Classification Search
CPC . A45F 3/44; A45C 3/10; F04D 29/646; F04D 13/0693; F04D 25/068; F04D 25/088; F04D 27/00; F21V 33/0096; F21V 23/003
USPC .......................................... 248/156, 342–344
See application file for complete search history.

(56) References Cited

U.S. PATENT DOCUMENTS

| | | | |
|---|---|---|---|
| 4,448,388 A | 5/1984 | Dennis et al. | |
| 4,697,777 A * | 10/1987 | Yang ...................... | F16M 11/10 248/343 |
| 4,729,725 A | 3/1988 | Markwardt | |
| 5,090,654 A | 2/1992 | Ridings et al. | |
| 5,613,832 A * | 3/1997 | Su .......................... | F04D 25/088 416/244 R |
| 5,947,436 A * | 9/1999 | Bucher .................. | F04D 29/601 248/27.1 |
| 6,171,061 B1 | 1/2001 | Hsu | |
| 6,203,279 B1 * | 3/2001 | Moody .................. | F04D 25/088 248/343 |
| 6,598,846 B1 | 7/2003 | Lackey, Jr. | |
| 6,761,540 B2 | 7/2004 | Tseng | |
| 6,872,054 B2 * | 3/2005 | Pearce ................... | F04D 29/601 248/342 |
| 6,877,703 B2 * | 4/2005 | Tang ...................... | F04D 25/088 248/220.22 |
| 6,981,678 B2 * | 1/2006 | Fu-Liang ............... | F04D 29/601 248/343 |
| 7,249,744 B2 * | 7/2007 | Bacon ................... | F04D 25/088 248/343 |
| 7,261,520 B2 * | 8/2007 | Wang .................... | F04D 25/088 248/343 |

(Continued)

*Primary Examiner* — Nkeisha Smith
(74) *Attorney, Agent, or Firm* — Brian S. Steinberger; Hilary F. Steinberger; Law Offices of Brian S. Steinberger, P.A.

(57) ABSTRACT

Systems, apparatus, devices, apparatus, assemblies and methods for hanging a ceiling fan with a down rod to a ceiling canopy assembly with a floating hanger assembly which eliminates wobble effects, such as up and down motions and side to side motions while the ceiling ran is running. The floating hanger assembly an include a ceiling mounting bracket attached to a ceiling with an upper opening for supporting a floating hanger support to be supported therein. A down rod with an enlarged partial ball shaped upper end can be supported within the floating hanger support, and a lower end of the down rod attached to a ceiling fan.

17 Claims, 16 Drawing Sheets

(56) References Cited

U.S. PATENT DOCUMENTS

| | | | | |
|---|---|---|---|---|
| 7,621,498 B2* | 11/2009 | Tang | .................. | F04D 29/60 |
| | | | | 248/317 |
| 8,033,787 B1* | 10/2011 | Miller | .................. | F04D 25/088 |
| | | | | 416/5 |
| 8,336,844 B2 | 12/2012 | Pearce | | |
| 8,353,675 B2* | 1/2013 | Lin | .................. | F04D 29/601 |
| | | | | 416/244 R |
| 9,587,518 B2* | 3/2017 | Oleson | .................. | F04D 29/601 |
| 2003/0067779 A1 | 4/2003 | Lo | | |
| 2005/0006549 A1* | 1/2005 | Liu | .................. | F04D 29/601 |
| | | | | 248/343 |
| 2006/0263224 A1* | 11/2006 | Wang | .................. | F04D 25/088 |
| | | | | 416/244 R |
| 2008/0181783 A1 | 7/2008 | Pearce | | |
| 2009/0230274 A1* | 9/2009 | Tang | .................. | F04D 29/60 |
| | | | | 248/343 |
| 2010/0221120 A1* | 9/2010 | Lin | .................. | F04D 29/601 |
| | | | | 416/244 R |
| 2020/0141537 A1* | 5/2020 | Trout | .................. | F16M 13/027 |

\* cited by examiner

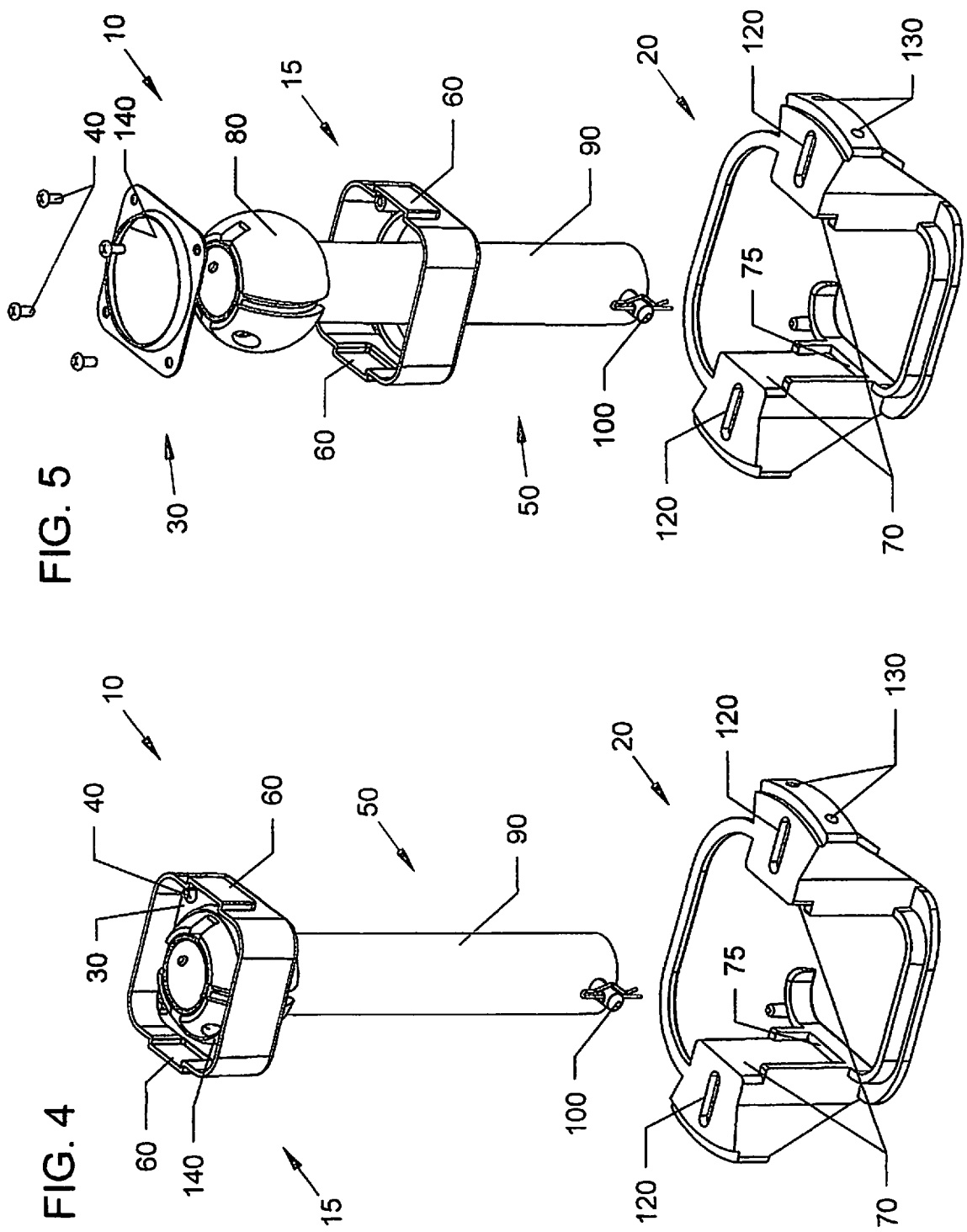

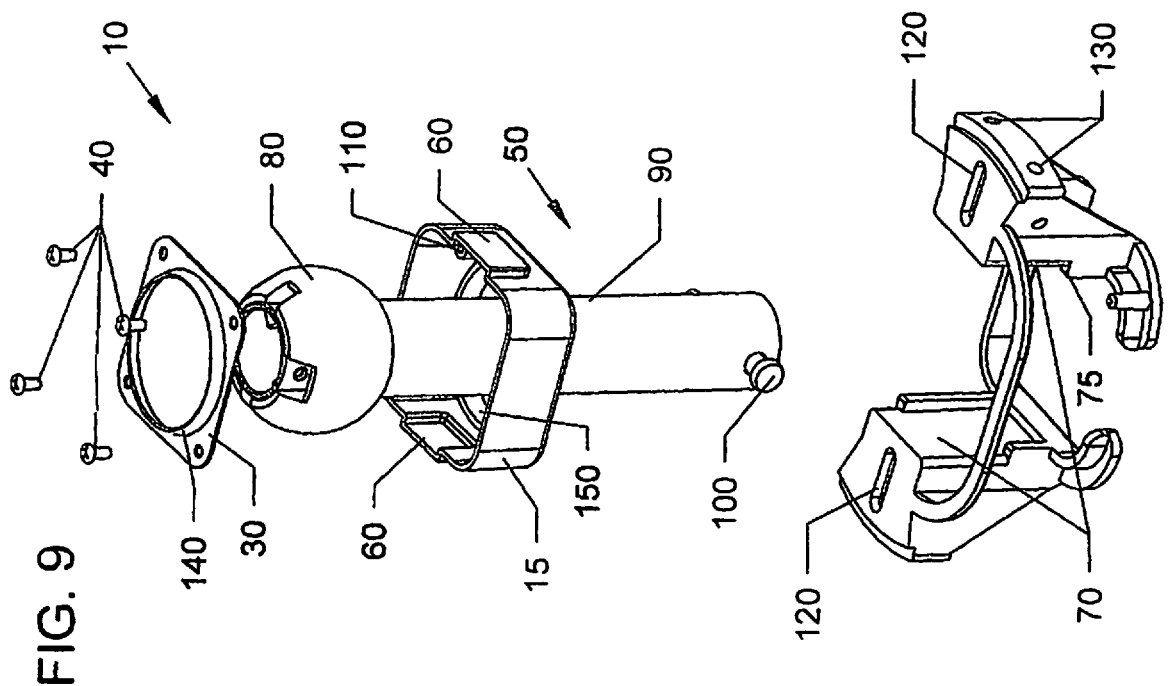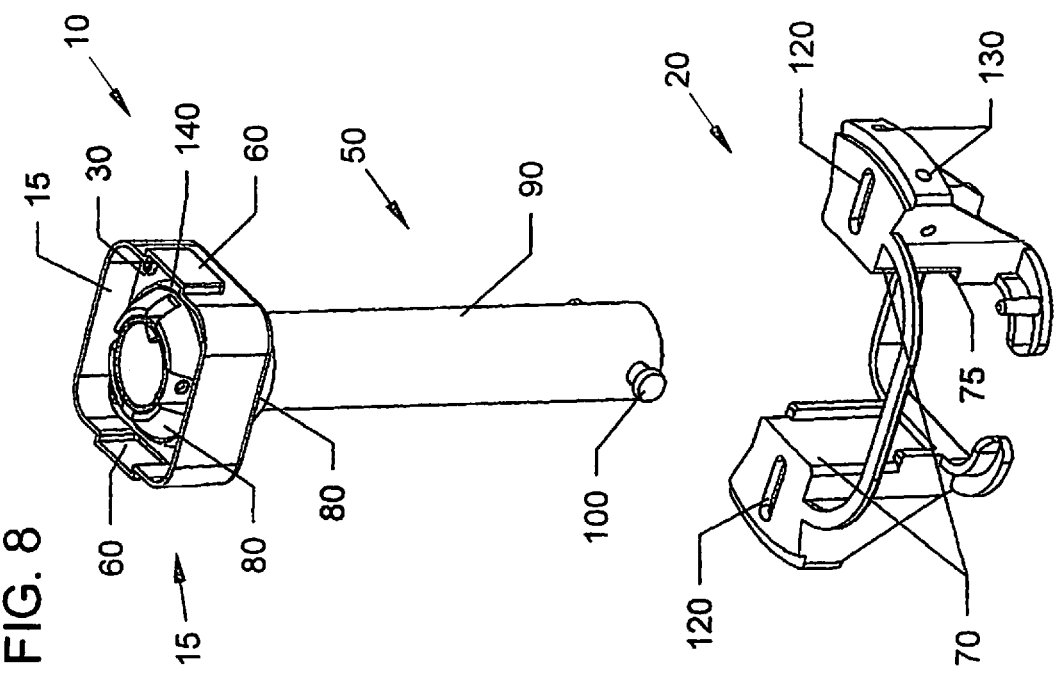

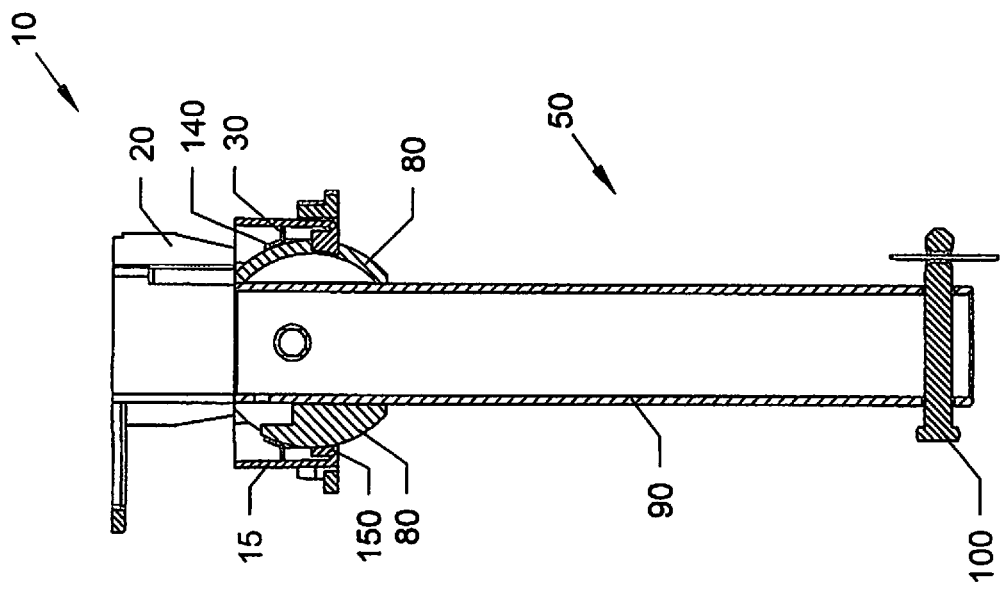
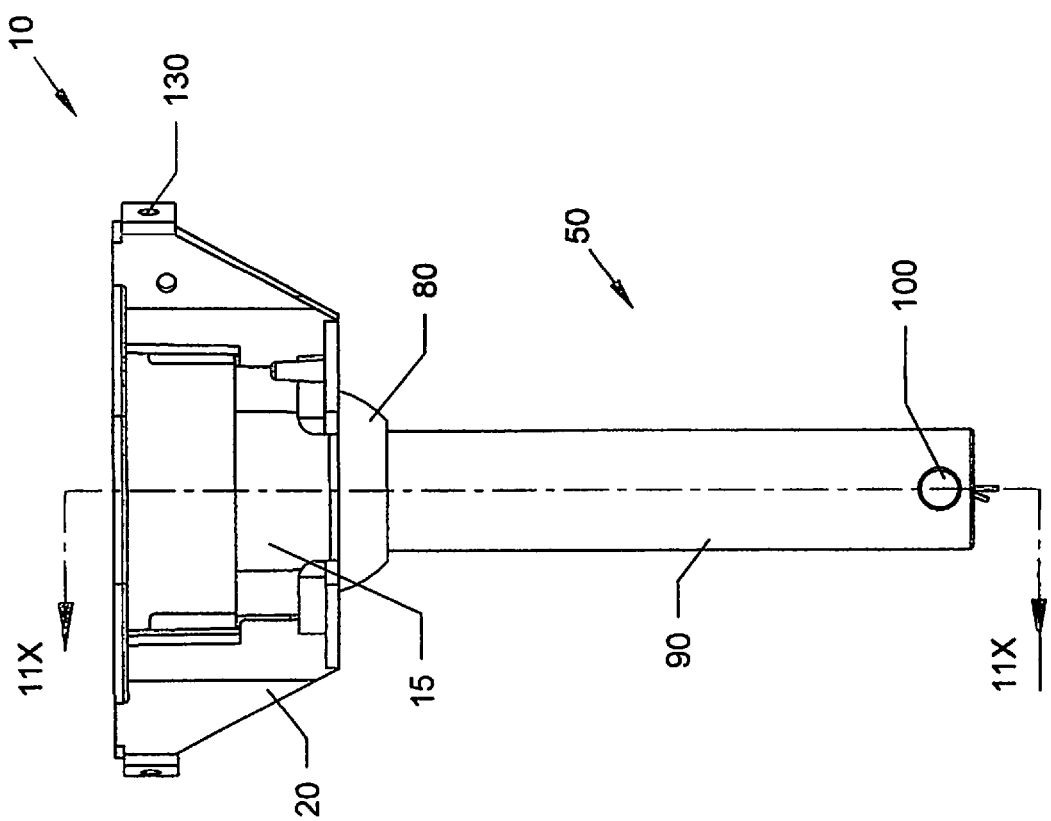

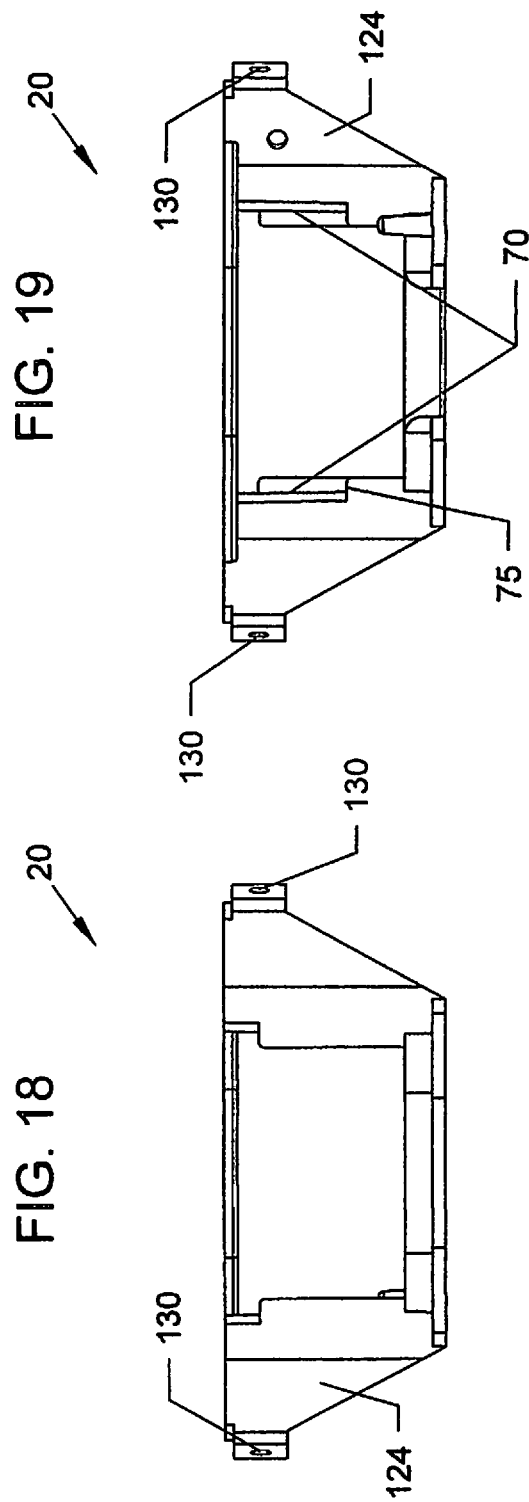

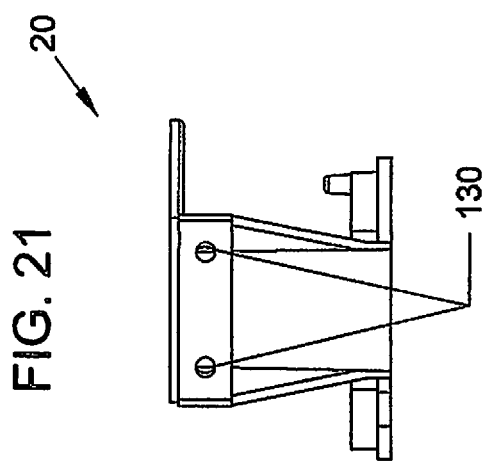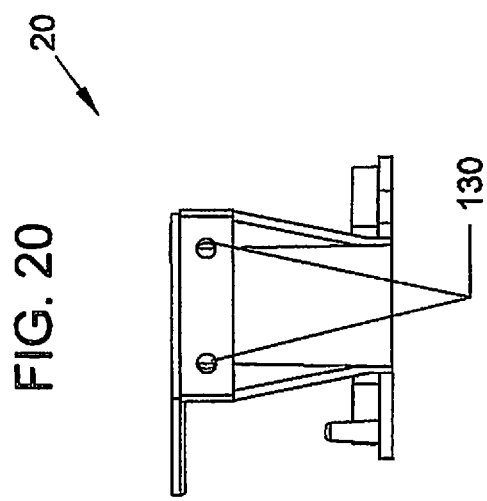

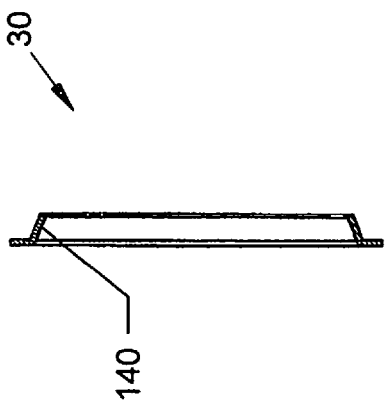
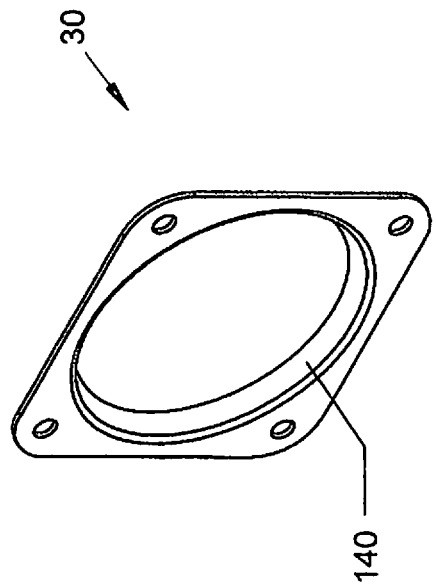
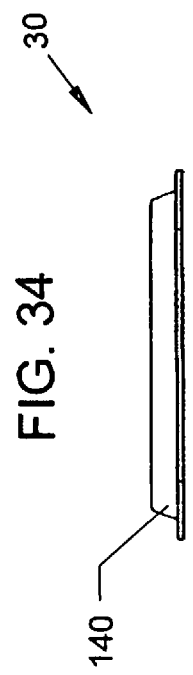
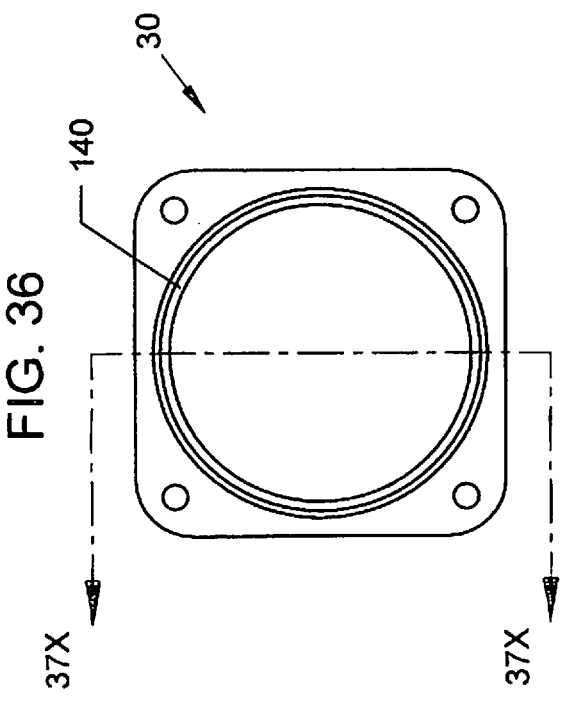

SELF BALANCING HANGER BRACKET

FIELD OF INVENTION

This invention relates to ceiling fans, and in particular to systems, apparatus, devices, assemblies, and methods for hanging a ceiling fan by a down rod to a ceiling canopy bracket assembly which eliminates wobble effects, such as up and down motions and side to side motions while the ceiling ran is running.

BACKGROUND AND PRIOR ART

Down rods have been used to mount ceiling fans to ceiling mounts, where ball shaped upper ends of the down rods can be supported in a ceiling mounted canopy. These arrangements have been used where the ceiling is horizontal and sloped, and are intended to try to reduce some rocking and swaying motion of the fan if an unbalance occurs while the fans are running See for example, U.S. Pat. No. 4,729,725 to Markwardt; U.S. Pat. No. 5,090,654 to Ridings et al.; to Dennis et al.; U.S. Pat. No. 6,171,061 to Hsu; U.S. Pat. No. 6,203,279 to Moody et al. and U.S. Pat. No. 6,598,846 to Lackey, Jr.

However, the these types of ball shapes on upper ends of the down rods do not eliminate all the wobble effects, such as up and down motions and side to side motions while the ceiling ran is running Thus, the need exists for solutions to the above problems with the prior art.

SUMMARY OF THE INVENTION

A primary objective of the present invention is to provide systems, apparatus, devices, assemblies, and methods for hanging a ceiling fan by a down rod to a ceiling canopy assembly which eliminates wobble effects, such as up and down motions and side to side motions while the ceiling fan is running.

A secondary objective of the present invention is to substantially reduce wobble effects, such as up and down motions and side to side motions while a down rod mounted ceiling fan is running.

A preferred embodiment of a ceiling fan hanging system, can include a ceiling bracket adapted for being attached to a ceiling, the bracket having a top opening and a bottom opening, a floating hanger support having sides for mateably being received within the top opening of the ceiling bracket, the hanger support having a bottom with an opening therethrough, and a down rod having an upper end with a partial ball shape and a lower end, the partial ball shape portion for sitting above the bottom opening of the hanger support with the lower end extending below the ceiling bracket, wherein a ceiling fan motor with blades extending therefrom is attached to the lower end of the down rod, and wherein the hanging system substantially reduces wobble effects which includes up and down motions and side to side motions while the ceiling ran is running.

The ceiling bracket can include side flanges adapted for attaching the ceiling bracket to a ceiling.

The ceiling bracket can include inner channels for allowing outwardly extending members on the hanger support to slide therein.

The inner channels and the outwardly extending members can each have a rectangular configuration. The inner channels of the ceiling bracket can include inwardly protruding ledges for supporting lower edges of the outwardly extending members on the hanger support.

The hanging system can include a plate with a ring shaped opening, the ring shaped opening having a smaller diameter than a diameter of the partial shaped upper end of the down rod, the plate for fitting in the top opening of the ceiling bracket over the partial shaped upper end of the down rod.

An assembly for hanging ceiling fans, can include a canopy bracket adapted for being attached to a ceiling, the bracket having a top and a bottom opening, a floating hanger for being supported within the canopy bracket, the hanger having a bottom with an opening therethrough, and a down rod having an upper end with an enlarged ball shaped portion and a lower end, the ball shaped portion for being supported above the bottom opening of the hanger with the lower end extending below the canopy bracket, wherein the assembly allows for a ceiling fan attached to the lower end of the down rod to have reduced wobble effects while the ceiling ran is running.

The canopy bracket can include portions adapted for attaching the ceiling bracket to a ceiling. The canopy bracket can include opposite facing inner channels within the bottom opening for allowing outwardly extending members on the hanger support to fit within.

The inner channels and the outwardly extending members can have rectangular configurations.

The inner channels of the canopy bracket can include inwardly protruding ledges for supporting lower edges of the outwardly extending members on the hanger support.

The assembly can include a plate with a ring shaped opening, the ring shaped opening having a smaller diameter than a diameter of the enlarged ball shaped portion on the down rod, the plate for fitting over the enlarged ball shaped portion on the down rod.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 4 is a partially exploded view of the floating hanger assembly of FIGS. 1-2 with the floating hanger support with down rod assembly separated from the ceiling mount bracket.

FIG. 5 is another exploded view of the floating assembly of FIGS. 1-4 with the ring plate removed and the down rod assembly lifted from the floating hanger.

FIG. 8 is a partially exploded view of the floating hanger assembly of FIG. 7 with the floating hanger support separated from the ceiling mount bracket.

FIG. 9 is another exploded view of the floating assembly of FIGS. 7-8 with the ring plate removed and the down rod assembly lifted from the floating hanger.

FIG. 10 is a front view of the floating hanger assembly of FIG. 2.

FIG. 11 is a cross-sectional view of the floating hanger assembly of FIG. 10 along arrows 11X.

FIG. 18 is a rear view of the floating hanger bracket of FIG. 14.

FIG. 19 is a front view of the floating hanger bracket of FIG. 14.

FIG. 20 is a left side view of the floating hanger bracket of FIG. 14.

FIG. 21 is a right side view of the floating hanger bracket of FIG. 14.

FIG. 34 is a front view of the ring plate used in the floating hanger assembly of the preceding figures.

FIG. 35 is a top perspective view of the ring plate of FIG. 34.

FIG. 36 is a top view of the ring plate of FIG. 34.

FIG. 37 is a cross-sectional view of the ring plate of FIG. 36 along arrows 37X.

DESCRIPTION OF THE PREFERRED EMBODIMENTS

Figure 1:
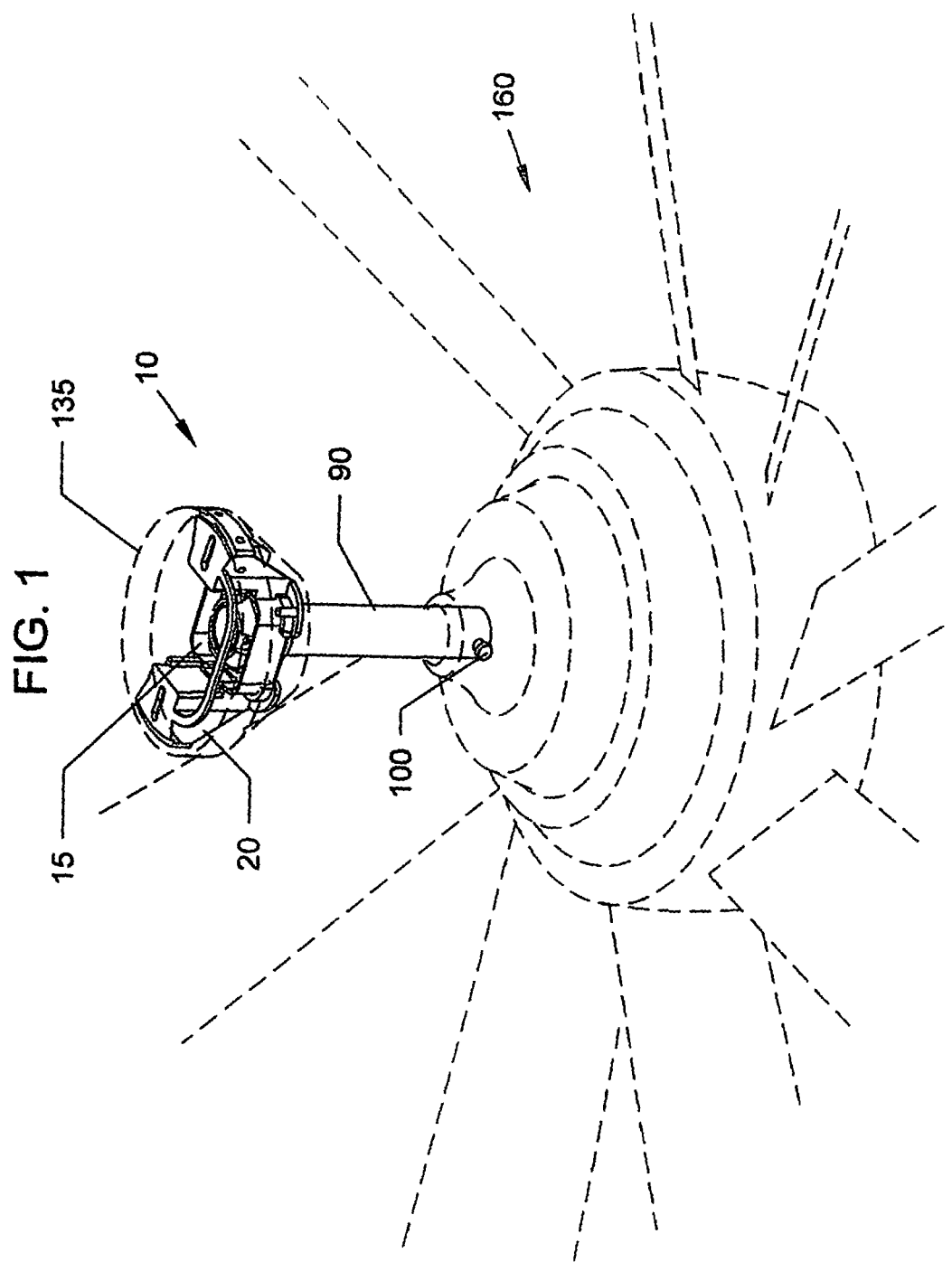
FIG. 1 is a top rear perspective view of floating hanger assembly showing its orientation with a ceiling fan.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.
10 Floating hanger assembly.
15 Floating hanger support
20 Ceiling mount (floating hanger) bracket.
30 Ring plate.
40 Ring plate mounting fasteners (screws & the like).
50 Down rod assembly.
60 outwardly protruding members (hanger boss).
70 inner side channels (bracket boss cavities).
75 ledges on bottom of channels (cavities)
80 Enlarged diameter partial ball shaped end portion (gimball ball portion)
90 Down rod.
100 Fan mount pin.
110 Ring plate mount boss.
120 Ceiling mount slot(s).
124 side flanges
130 Ceiling flange mount hole in ceiling mount bracket.
135 Canopy (ceiling mount trim flange).
140 Concave curved edges (ring plate gimbal cup edge).
150 Concave curved edges (hanger gimbal cup).
160 ceiling fan.

FIG. 1 is a top rear perspective view of floating hanger assembly 10 showing its orientation with a ceiling fan 160. The hanger assembly 10 can include a ceiling mount hanger bracket 20 (shown in more detail in FIGS. 14-23) that can be attached to a ceiling by fasteners, such as screws, and the like. A canopy (a ceiling mount trim flange) 135 can be used as a decorative cover over the ceiling mount bracket 20.

A novel floating hanger support 15, inside of the novel ceiling mount bracket 20 can support the upper end of a down rod 90 which will be described in greater detail below in reference to FIGS. 24-31. The lower end of the down rod 90 can be attached to a ceiling fan 160 by a mount pin 100, such as that shown in at least FIG. 9 of U.S. Pat. No. 6,761,540 to Tseng, which is incorporated by reference.

Figure 2:
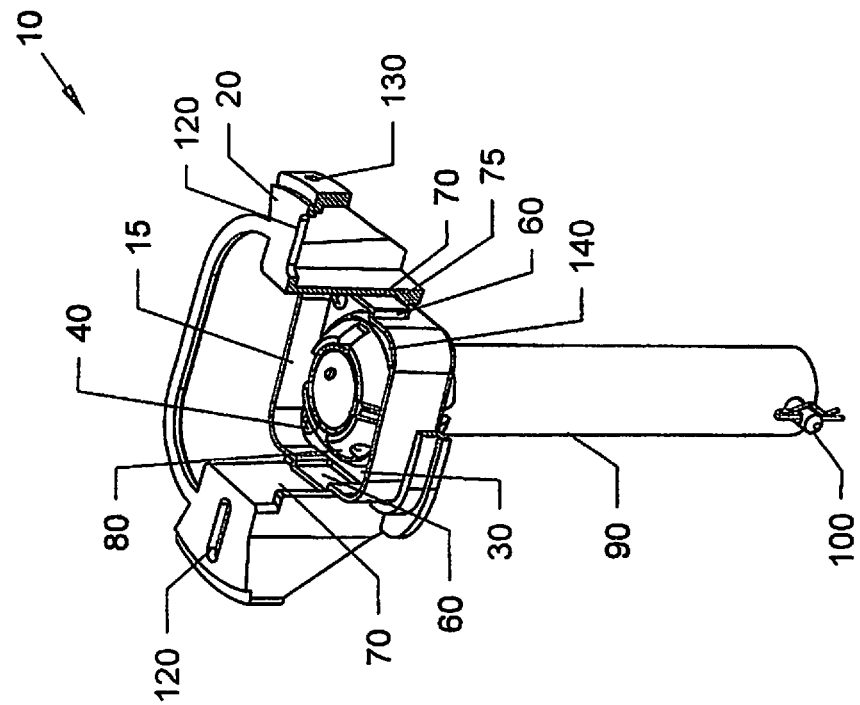
FIG. 2 is a top front perspective view of floating hanger assembly of FIG. 1.
Figure 3:
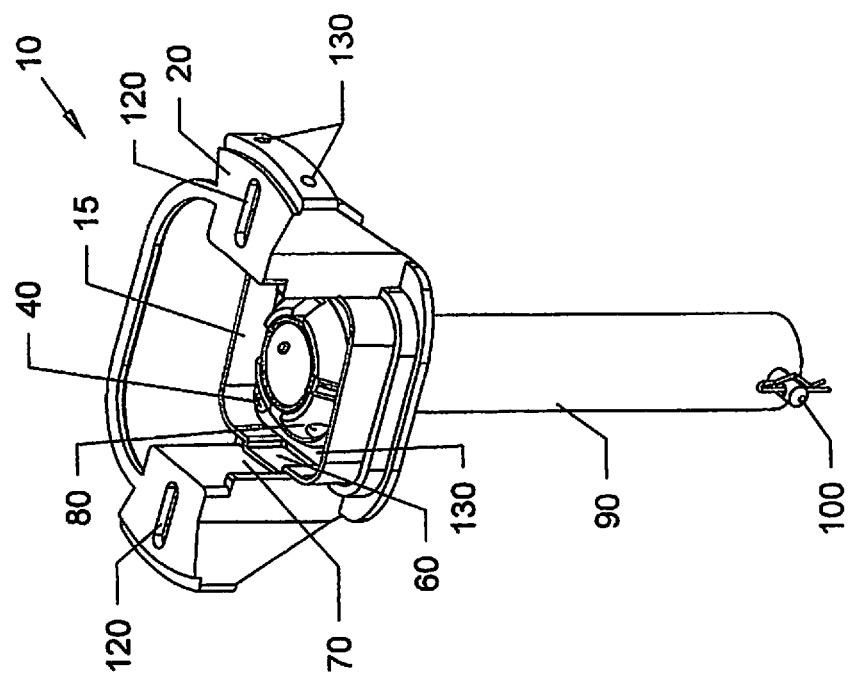
FIG. 3 is another view of FIG. 2 showing a front right cut-away of the ceiling mounting bracket in the floating hanger assembly.

The lower end of the down rod 90 can be attached to a ceiling fan 160 by a mount pin FIG. 2 is a top front perspective view of floating hanger assembly 20 of FIG. 1. FIG. 3 is another view of FIG. 2 showing a front right cut-away of the ceiling mounting bracket 20 in the floating hanger assembly 10.

FIG. 4 is a partially exploded view of the floating hanger assembly 10 of FIGS. 1-2 with the floating hanger support 15 with down rod assembly 50 separated from the ceiling mount bracket 10

FIG. 5 is another exploded view of the floating assembly 10 of FIGS. 1-4 with the ring plate 30 removed and the down rod assembly 50 lifted from the floating hanger support 15.

Figure 7:
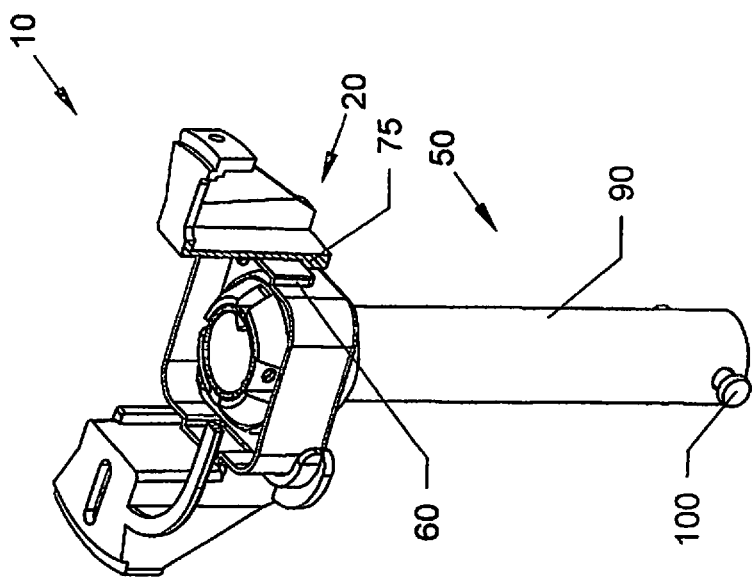
FIG. 7 is another view of FIG. 6 showing a front right cut-away of the ceiling mounting bracket.
Figure 6:
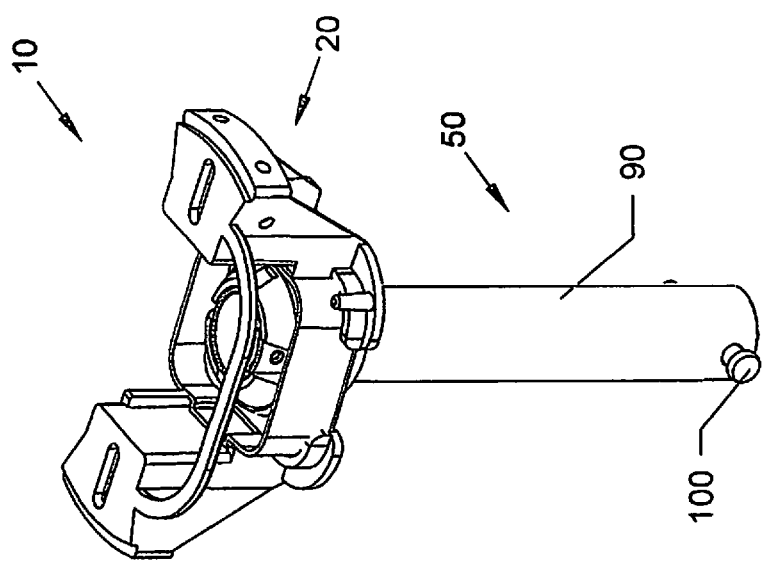
FIG. 6 is a top rear perspective view of floating hanger assembly of FIG. 2.

FIG. 6 is a top rear perspective view of floating hanger assembly 10 of FIG. 2. FIG. 7 is another view of floating hanger assembly 10 of FIG. 6 showing a front right cut-away of the ceiling mounting bracket.

FIG. 8 is a partially exploded view of the floating hanger assembly 10 of FIG. 7 with the floating hanger support 15 with down rod assembly 40 separated from the ceiling mount bracket 20. FIG. 9 is another exploded view of the floating assembly 10 of FIGS. 7-8 with the ring plate 30 removed and the down rod assembly 50 lifted from the floating hanger support 15.

FIG. 10 is a front view of the floating hanger assembly 10 of FIG. 2. FIG. 11 is a cross-sectional view of the floating hanger assembly 10 of FIG. 10 along arrows 11X.

Figure 13:
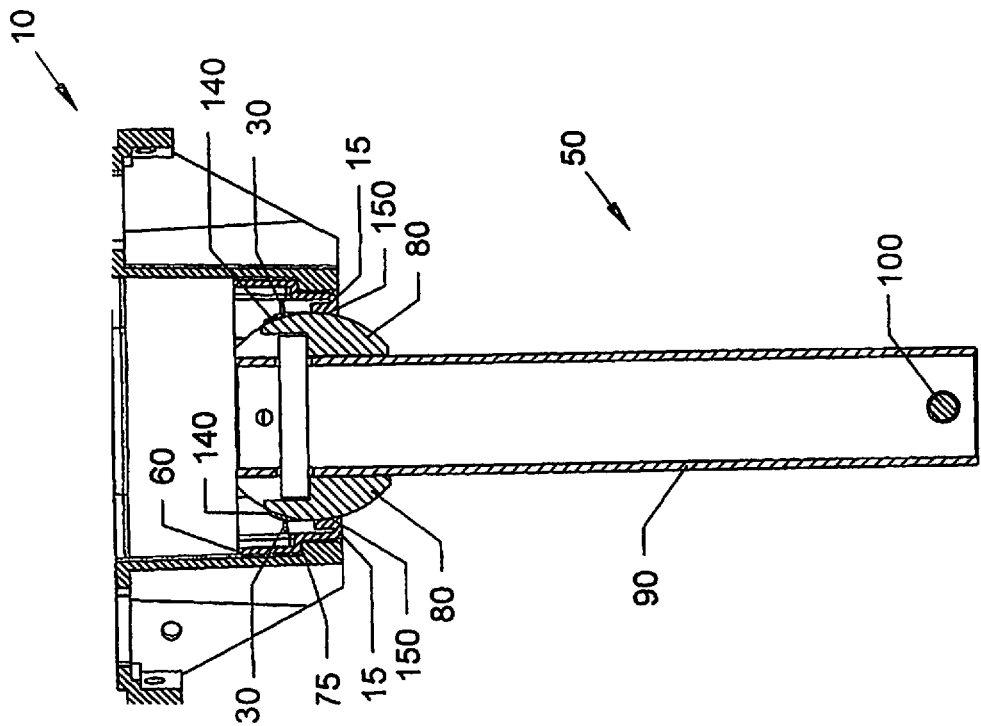
FIG. 13 is a cross-sectional view of the floating hanger assembly of FIG. 12 along arrows 13X
Figure 12:
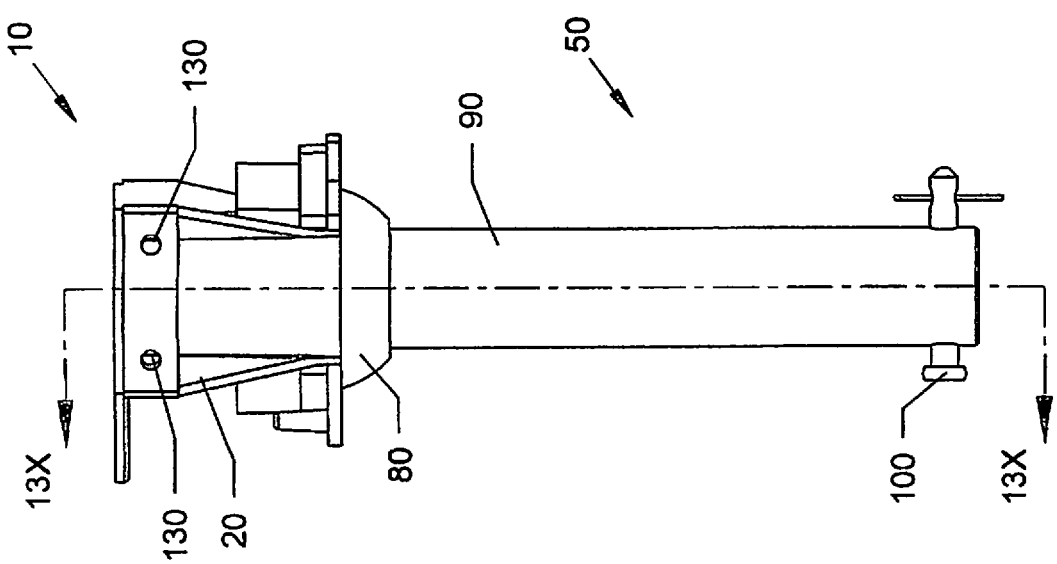
FIG. 12 is a right side view of the floating hanger assembly of FIG. 10.

FIG. 12 is a right side view of the floating hanger assembly 10 of FIG. 10. FIG. 13 is a cross-sectional view of the floating hanger assembly 10 of FIG. 12 along arrows 13X

Figure 14:
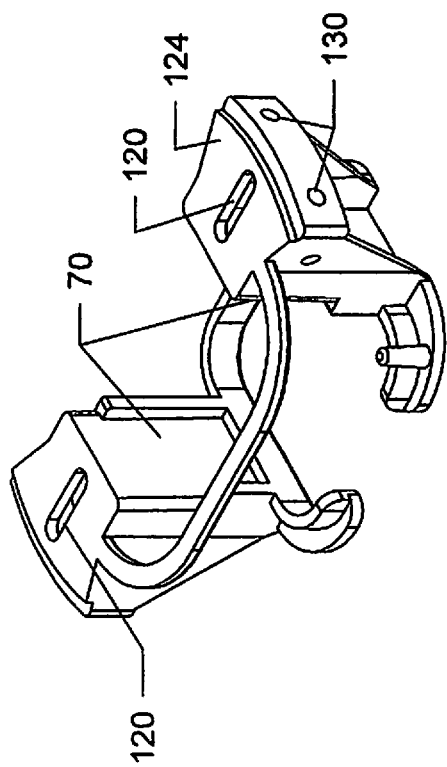
FIG. 14 is a top front perspective view of the floating hanger bracket used in the floating hanger assembly of FIGS. 1-13.
Figure 15:
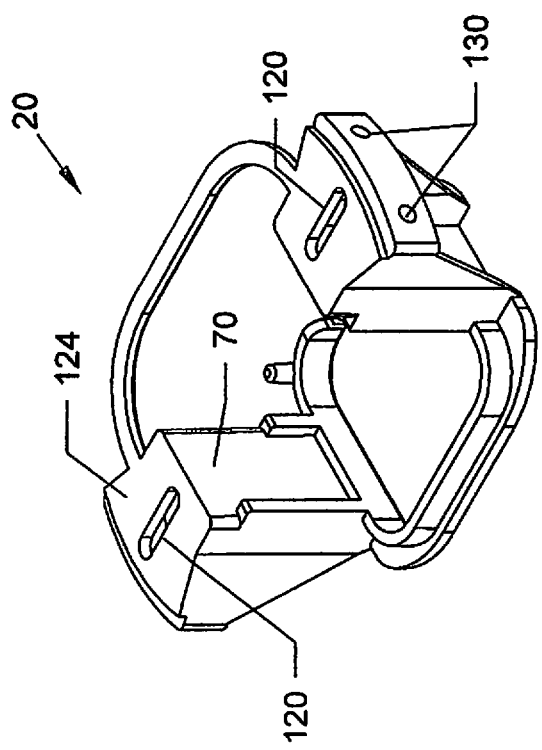
FIG. 15 is a top rear perspective view of the floating hanger bracket of FIG. 14.
Figure 17:
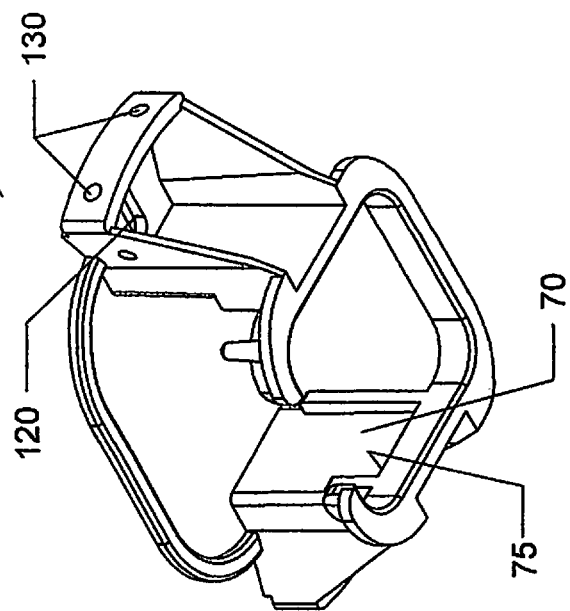
FIG. 17 is a bottom front perspective view of the floating hanger bracket of FIG. 14.
Figure 16:
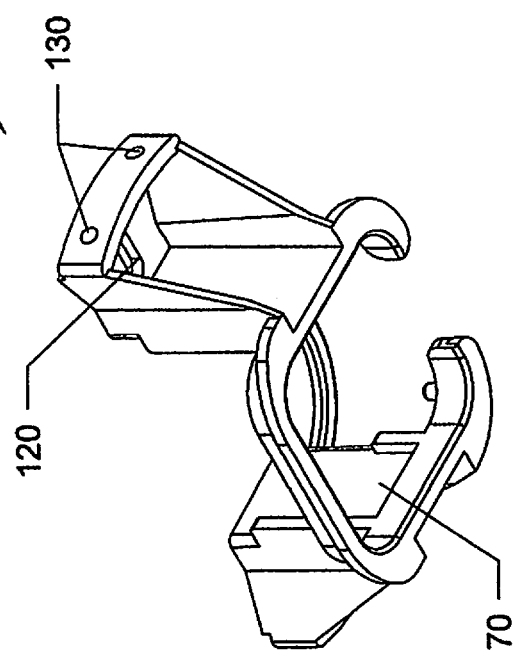
FIG. 16 is a bottom rear perspective view of the floating hanger bracket of FIG. 14.
Figure 22:
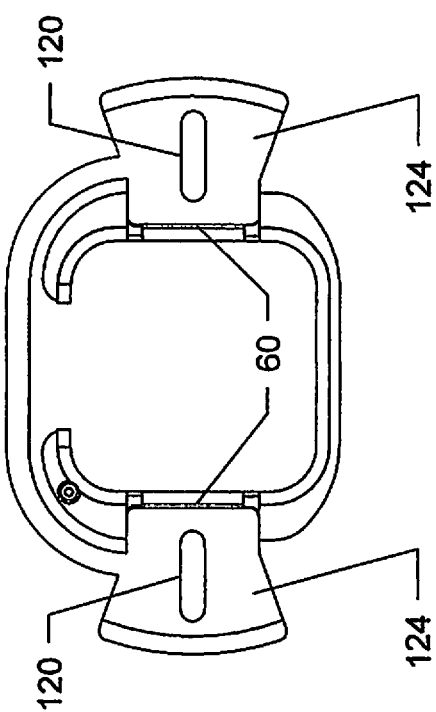
FIG. 22 is a bottom view of the floating hanger bracket of FIG. 14.
Figure 23:
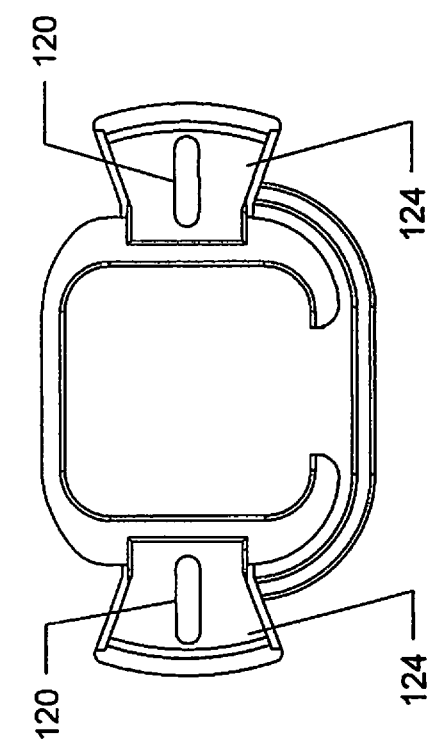
FIG. 23 is a top view of the floating hanger bracket of FIG. 14.

FIG. 14 is a top front perspective view of the floating hanger bracket 20 used in the floating hanger assembly 10 of FIGS. 1-13. FIG. 15 is a top rear perspective view of the floating hanger bracket 20 of FIG. 14. FIG. 16 is a bottom rear perspective view of the floating hanger bracket 20 of FIG. 14. FIG. 17 is a bottom front perspective view of the floating hanger bracket 20 of FIG. 14. FIG. 18 is a rear view of the floating hanger bracket 20 of FIG. 14. FIG. 19 is a front view of the floating hanger bracket 20 of FIG. 14. FIG. 20 is a left side view of the floating hanger bracket 20 of FIG. 14. FIG. 21 is a right side view of the floating hanger bracket 20 of FIG. 14. FIG. 22 is a bottom view of the floating hanger bracket 20 of FIG. 14. FIG. 23 is a top view of the floating hanger bracket 20 of FIG. 14.

Referring to FIGS. 1 and 14-23, the ceiling mounting hanger bracket 20 can include side flanges 124 having vertical ceiling mount slots 120 that are similar to those parts shown in mount brackets, shown and described in U.S. Pat. No. 5,090,654 to Ridings et al.; U.S. Pat. No. 6,171,061 to Hsu; and U.S. Pat. No. 6,203,279 to Moody et al., which are incorporated by reference in their entirety. Side facing holes 130 can be used to so that a decorative trim canopy 135 can be attached thereto.

Novel parts of the ceiling mounting hanger bracket 20 can include at least two inner facing channels (bracket boss cavities) 70, each having bottom ledges 75.

Figure 25:
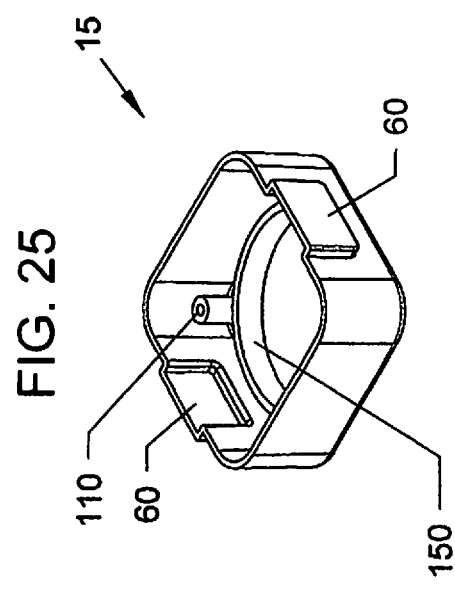
FIG. 25 is a top rear view of the floating hanger support of FIG. 24.
Figure 27:
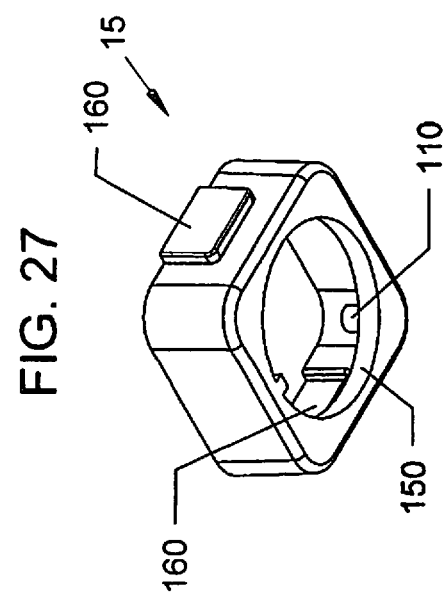
FIG. 27 is a bottom rear view of the floating hanger support of FIG. 24.
Figure 24:
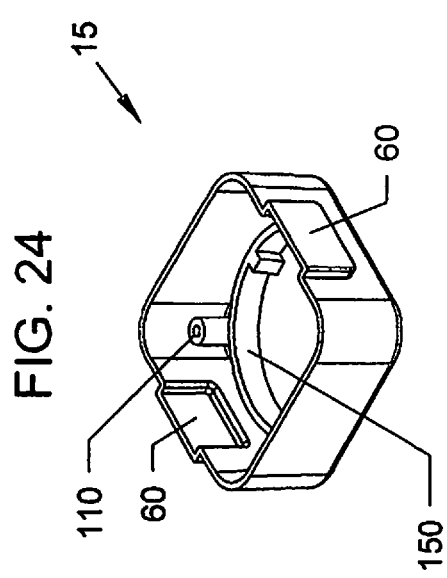
FIG. 24 is a top front view of the floating hanger support used in the floating hanger assembly of the preceding figures.
Figure 26:
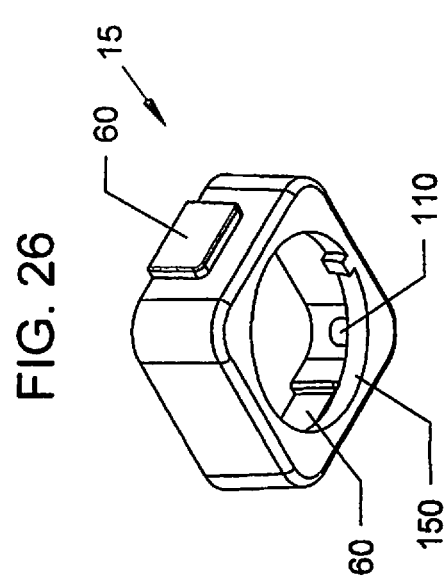
FIG. 26 is a bottom front view of the floating hanger support of FIG. 24.
Figure 28:
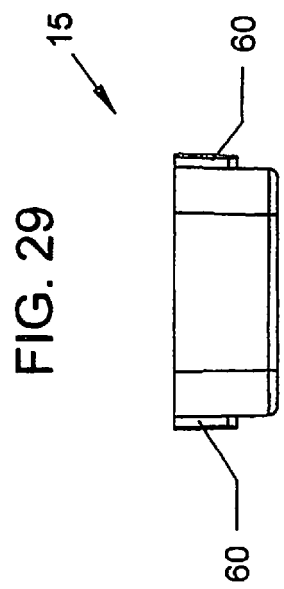
FIG. 28 is a front view of the floating hanger support of FIG. 24.
Figure 29:
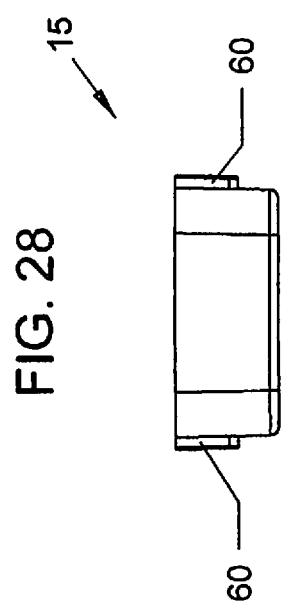
FIG. 29 is a rear view of the floating hanger support of FIG. 24.
Figure 30:
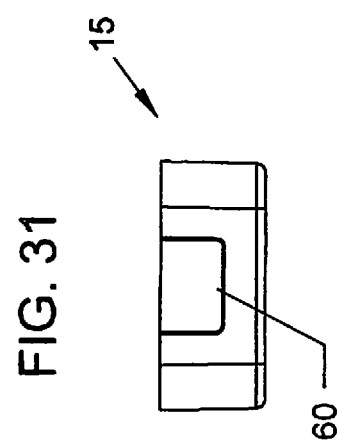
FIG. 30 is a left side view of the floating hanger support of FIG. 24.
Figure 31:
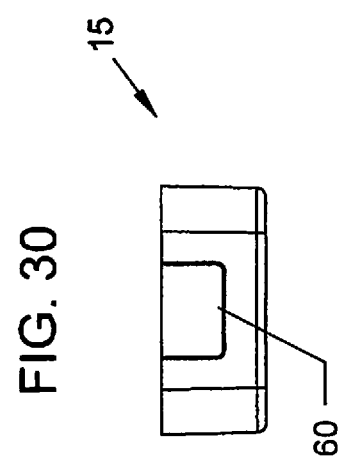
FIG. 31 is a right side view of the floating hanger support of FIG. 24.
Figure 32:
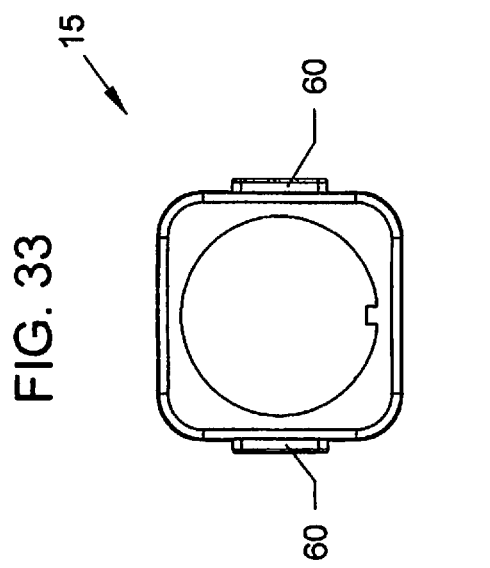
FIG. 32 is a top view of the floating hanger support of FIG. 24.
Figure 33:
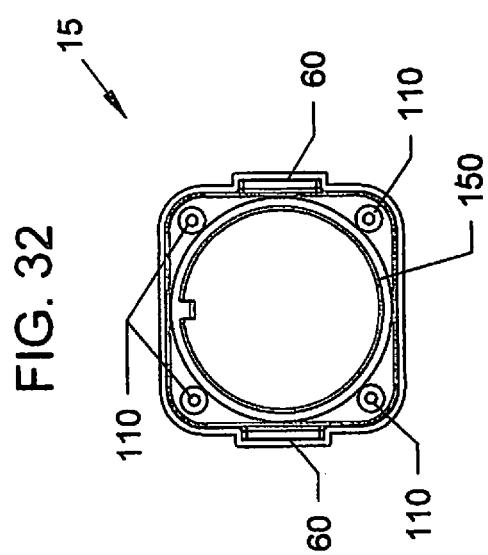
FIG. 33 is a bottom view of the floating hanger support of FIG. 24.

FIG. 24 is a top front view of the floating hanger support 15 used in the floating hanger assembly 10 of the preceding figures. FIG. 25 is a top rear view of the floating hanger support 15 of FIG. 24. FIG. 26 is a bottom front view of the floating hanger support 15 of FIG. 24. FIG. 27 is a bottom rear view of the floating hanger support 15 of FIG. 24. FIG. 28 is a front view of the floating hanger support 15 of FIG. 24. FIG. 29 is a rear view of the floating hanger support 15 of FIG. 24. FIG. 30 is a left side view of the floating hanger support 15 of FIG. 24. FIG. 31 is a right side view of the floating hanger support 15 of FIG. 24. FIG. 32 is a top view of the floating hanger support 15 of FIG. 24. FIG. 33 is a bottom view of the floating hanger support 15 of FIG. 24.

Referring to FIGS. 24-33, the floating hanger support 15 can have an open top, and side walls having a rectangular configuration with a bottom having a concave curved edge (hanger gimbal cup) 150 which can support the enlarged diameter partial ball shaped end 80 on the upper end of the down rod 90 (shown in FIGS. 4, 5, 8, 9, 11 and 13.

FIG. 34 is a front view of the ring plate 30 used in the floating hanger assembly 10 of the preceding figures. FIG. 35 is a top perspective view of the ring plate 30 of FIG. 34. FIG. 36 is a top view of the ring plate 30 of FIG. 34. FIG. 37 is a cross-sectional view of the ring plate 30 of FIG. 36 along arrows 37X.

Referring to FIGS. 2-9, 11, 13, and 24-37, the ring plate 30 can be positioned over the top of enlarged ball shaped end portion 80 on the upper end of the down rod 90, after the down rod 90 with the enlarged ball shaped end portion 80 is positioned into the floating hanger support 15. The concave curved edge (ring plate gimbal cup) 14 can rest against the enlarged ball shaped end portion 80 and be held in place by fasteners 40 which can attach the plate 30 to mount bosses 110 in the floating hanger support 15.

Referring to FIGS. 4 and 8, after the down rod 90 with upper enlarged end 80 is mounted into the floating hanger support 15, these assembled parts can be dropped into the top central opening of the ceiling mount hanger bracket 20. The outwardly facing protruding members (hanger bosses) 60 on the hanger support 15 can be positioned to slide into upper open ends of the inner facing channels (bracket boss cavities) 70 in the ceiling mount bracket 20. Lower ledges 75 on the inner facing channels (bracket boss cavities) 70 can form a rest top for the bottom edges of the outwardly facing protruding members (hanger bosses) 60 on the hanger support 15.

FIGS. 3-5, 7, 13 show the final position of the bottom of the outwardly facing protruding members (hanger bosses) 60 abutting the ledges 75 in the inner facing channels 70 inside the ceiling mounting bracket 20. This mounting arrangement is able to substantially reduce and potentially eliminate wobbling effects, such as up and down motions and side to side motions while the ceiling ran is running.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A ceiling fan hanging system, comprising:
    a ceiling bracket adapted for being attached to a ceiling, the bracket having a top opening and a bottom opening;
    a floating hanger support having sides for mateably being received within the top opening of the ceiling bracket, the hanger support having a bottom with an opening therethrough; and
a down rod having an upper end with a partial ball shape and a lower end, the partial ball shape upper end for sitting above the bottom opening of the hanger support with the lower end extending below the ceiling bracket, wherein a ceiling fan motor with blades extending therefrom is attached to the lower end of the down rod, and wherein the hanging system substantially reduces wobble effects which includes up and down motions and side to side motions while the ceiling ran is running, wherein the ceiling bracket includes:
    inner channels for allowing outwardly extending members on the hanger support to slide therein.

2. The ceiling fan hanging system of claim 1, wherein the inner channels and the outwardly extending members each have a rectangular configuration.

3. The ceiling fan hanging system of claim 2, wherein the inner channels of the ceiling bracket includes
    inwardly protruding ledges for supporting lower edges of outwardly extending members on the hanger support.

4. The ceiling fan hanging system of claim 2, further comprising:
    a plate with a ring shaped opening, the ring shaped opening having a smaller diameter than a diameter of the partial ball shape upper end of the down rod, the plate for fitting in the top opening of the ceiling bracket over the partial shaped upper end of the down rod.

5. The ceiling fan hanging system of claim 1, wherein the inner channels of the ceiling bracket includes
    inwardly protruding ledges for supporting lower edges of the outwardly extending members on the hanger support.

6. The ceiling fan hanging system of claim 5, further comprising:
    a plate with a ring shaped opening, the ring shaped opening having a smaller diameter than a diameter of the partial ball shape upper end of the down rod, the plate for fitting in the top opening of the ceiling bracket over the partial ball shape upper end of the down rod.

7. The ceiling fan hanging system of claim 1, further comprising:
    a plate with a ring shaped opening, the ring shaped opening having a smaller diameter than a diameter of the partial ball shape upper end of the down rod, the plate for fitting in the top opening of the ceiling bracket over the partial ball shape upper end of the down rod.

8. A ceiling fan hanging system, comprising:
    a ceiling bracket adapted for being attached to a ceiling, the bracket having a top opening and a bottom opening;
    a floating hanger support having sides for mateably being received within the top opening of the ceiling bracket, the hanger support having a bottom with an opening therethrough; and
a down rod having an upper end with a partial ball shape and a lower end, the partial ball shape upper end for sitting above the bottom opening of the hanger support with the lower end extending below the ceiling bracket, wherein a ceiling fan motor with blades extending therefrom is attached to the lower end of the down rod, and wherein the hanging system substantially reduces wobble effects which includes up and down motions and side to side motions while the ceiling ran is running; and
    a plate with a ring shaped opening, the ring shaped opening having a smaller diameter than a diameter of the partial ball shape upper end of the down rod, the plate for fitting in the top opening of the ceiling bracket over the partial ball shape upper end of the down rod.

9. An assembly for hanging ceiling fans, comprising:
    a canopy bracket adapted for being attached to a ceiling, the bracket having a top and a bottom opening;
    a floating hanger support for being supported within the canopy bracket, the hanger having a bottom with an opening therethrough; and
a down rod having an upper end with an enlarged ball shaped portion and a lower end, the ball shaped portion for being supported above the bottom opening of the hanger with the lower end extending below the canopy bracket, wherein the assembly allows for a ceiling fan attached to the lower end of the down rod to have reduced wobble effects while the ceiling ran is running, wherein the canopy bracket includes:
    opposite facing inner channels within the bottom opening for allowing outwardly extending members on the hanger support to fit within.

10. The assembly of claim 9, wherein the canopy bracket includes:
    portions adapted for attaching the canopy bracket to a ceiling.

11. The assembly of claim 9, wherein the inner channels and the outwardly extending members have rectangular configurations.

12. The assembly of claim 11, wherein the inner channels of the canopy bracket includes:
    inwardly protruding ledges for supporting lower edges of outwardly extending members on the hanger support.

13. The assembly of claim 11, further comprising:
    a plate with a ring shaped opening, the ring shaped opening having a smaller diameter than a diameter of the enlarged ball shaped portion on the down rod, the plate for fitting over the enlarged ball shaped portion on the down rod.

14. The assembly of claim 9, wherein the inner channels of the canopy bracket includes:
    inwardly protruding ledges for supporting lower edges of the outwardly extending members on the hanger support.

15. The assembly of claim 14, further comprising:
    a plate with a ring shaped opening, the ring shaped opening having a smaller diameter than a diameter of the enlarged ball shaped portion on the down rod, the plate for fitting over the enlarged ball shaped portion on the down rod.

16. The assembly of claim 9, further comprising:
    a plate with a ring shaped opening, the ring shaped opening having a smaller diameter than a diameter of the enlarged ball shaped portion on the down rod, the plate for fitting over the enlarged ball shaped portion on the down rod.

17. An assembly for hanging ceiling fans, comprising:

a canopy bracket adapted for being attached to a ceiling, the bracket having a top and a bottom opening;

a floating hanger for being supported within the canopy bracket, the hanger having a bottom with an opening therethrough; and a down rod having an upper end with an enlarged ball shaped portion and a lower end, the ball shaped portion for being supported above the bottom opening of the hanger with the lower end extending below the canopy bracket, wherein the assembly allows for a ceiling fan attached to the lower end of the down rod to have reduced wobble effects while the ceiling ran is running; and a plate with a ring shaped opening, the ring shaped opening having a smaller diameter than a diameter of the enlarged ball shaped portion on the down rod, the plate for fitting over the enlarged ball shaped portion on the down rod.

\* \* \* \* \*